April 16, 1968  E. R. HUNTON  3,378,156
CONVERTIBLE RACK FOR VEHICLES
Filed May 9, 1966  3 Sheets-Sheet 1
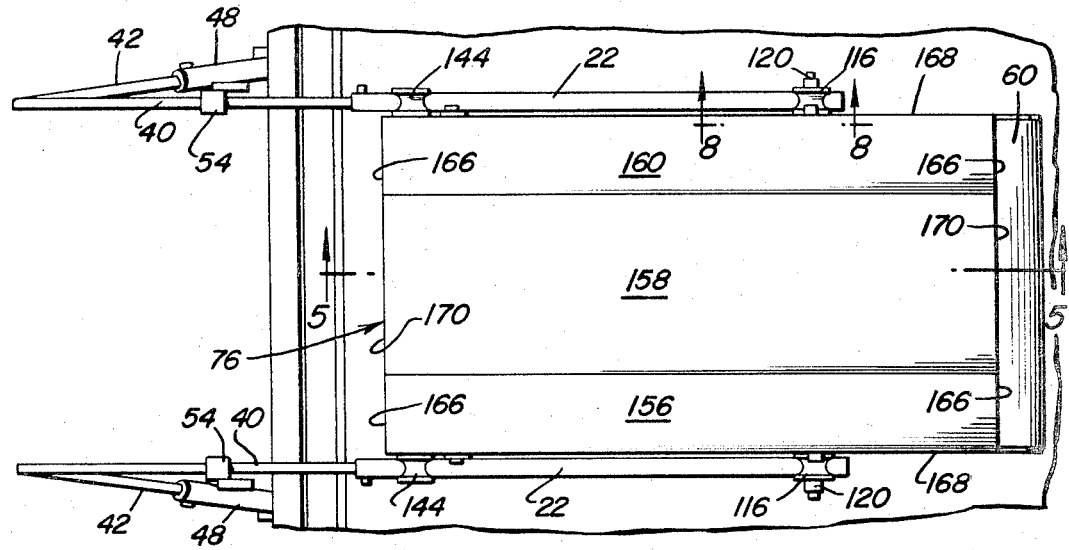
Fig. 1
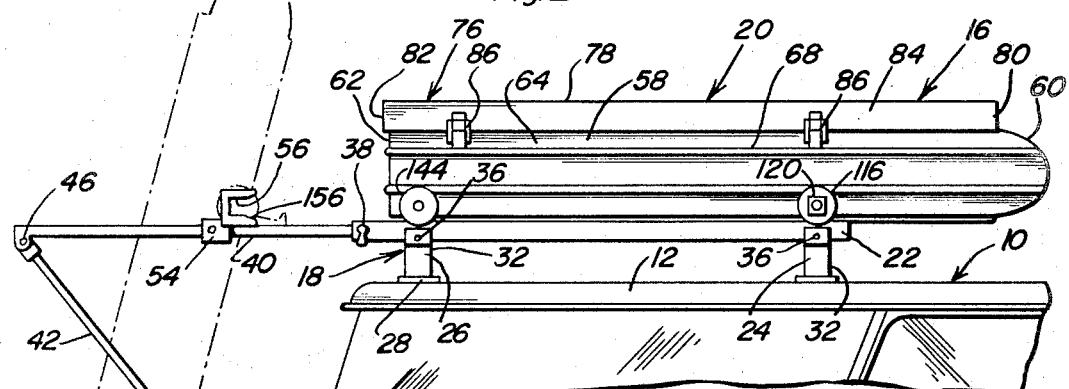
Fig. 2
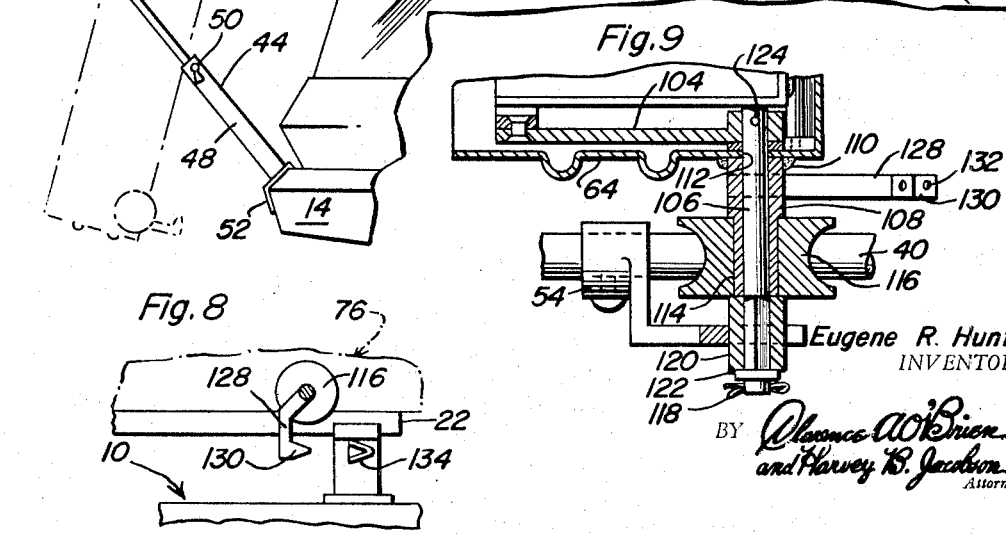
Eugene R. Hunton
INVENTOR.

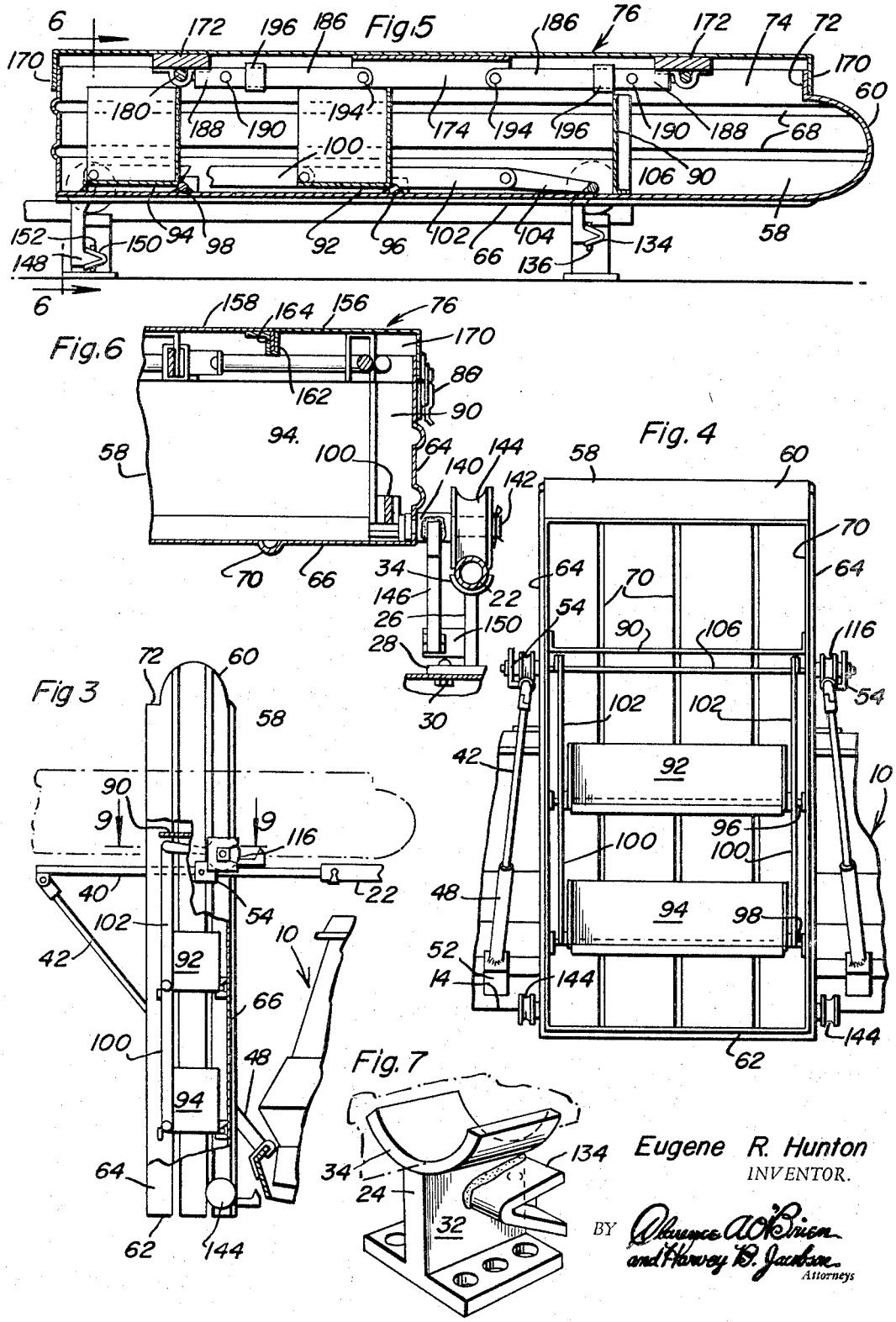

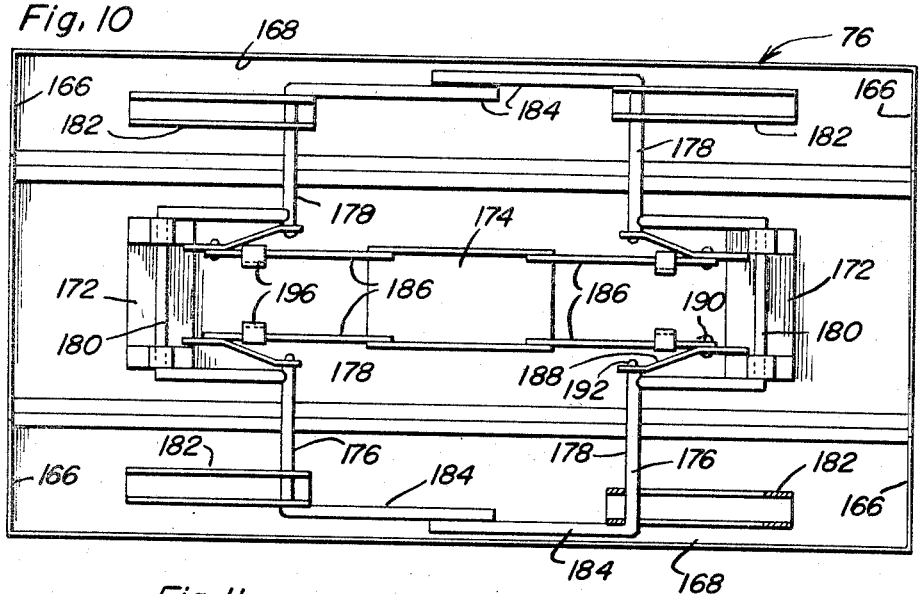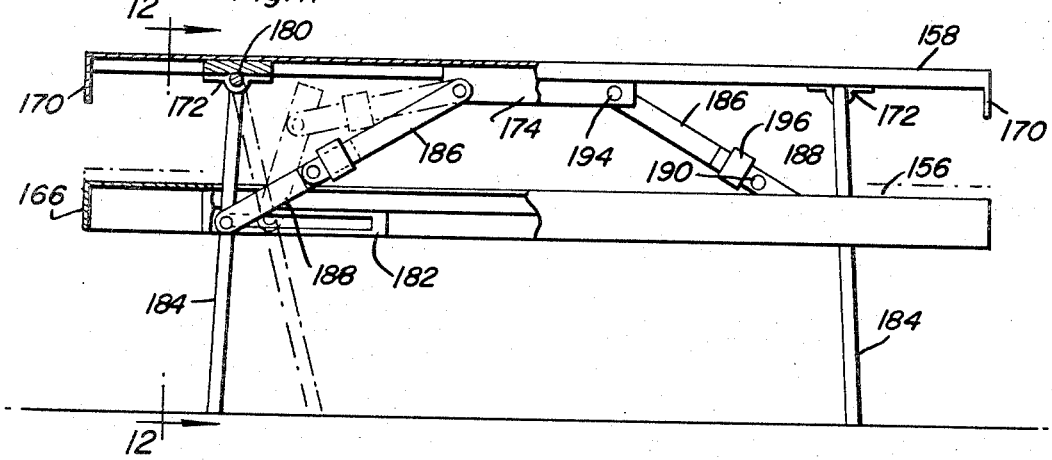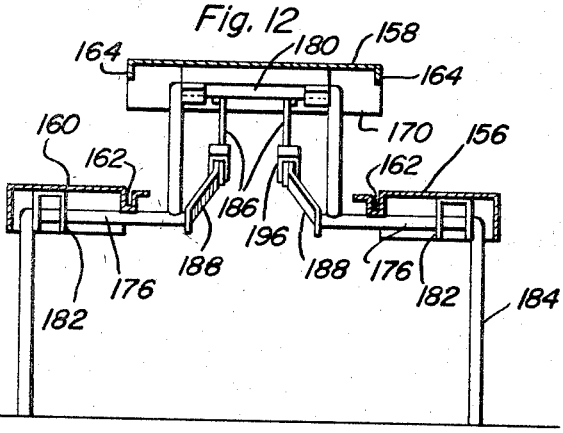

United States Patent Office 3,378,156
Patented Apr. 16, 1968

3,378,156
CONVERTIBLE RACK FOR VEHICLES
Eugene R. Hunton, 403 S. Center,
Miles City, Mont. 59301
Filed May 9, 1966, Ser. No. 548,495
9 Claims. (Cl. 214—450)

ABSTRACT OF THE DISCLOSURE

A support and guide rack for support from a top portion of a vehicle and from which a housing is pivotally supported for oscillation of the housing relative to the support and guide means about a horizontal axis between a first position with one side of the housing facing upwardly and a second position with the one side of the housing facing generally horizontally, the housing having internal shelves pivotally supported therefrom and the support and guide means and the housing including coacting means for automatically maintaining the shelves in generally horizontally disposed position as the housing is pivoted relative to the support and guide means between the aforementioned first and second positions.

---

This invention relates to a novel and useful rack assembly for vehicles and is adapted to be carried on a top portion of a vehicle such as a sedan or station wagon.

The rack assembly of the instant invention includes a load supporting rack portion adapted to be secured to the top of a station wagon or the like and a hollow housing assembly or portion removably supported from the rack portion. The housing portion is of course adapted to enclose various articles to be transported from one location to another by the associated vehicle and is specifically adapted to carry camping equipment such as cooking utensils, food, and camping accessories such as a stove or the like, as well as other articles used by traveling or camping persons.

The housing assembly includes means by which a plurality of article supporting and storing areas or shelves are defined therein and mounted for simultaneous pivotal movement about parallel horizontal axes relative to the housing portion. In addition, the housing and rack portions include means by which the housing portion is slidably supported from the rack portion for reciprocal movement longitudinally of the latter and for pivotal movement of the housing portion relative to the rack portion after the housing portion has been shifted longitudinally of the rack portion a sufficient distance to position one end of the housing portion adjacent the opposite end of the rack portion.

The housing assembly may be pivoted relative to the rack portion about an axis generally paralleling the axes of rotation of the individual storage compartments or shelves within the housing portion and in this manner, assuming the one pivotally supported end of the housing has been shifted to the remote end of the rack portion adjacent one marginal edge of the top portion of the vehicle to which the rack is secured, the end of the housing assembly remote from the pivotally supported end thereof may be swung downwardly so that the normally upwardly facing side or top of the housing faces horizontally and outwardly of the aforementioned one marginal edge. In this manner the pivotally supported article storage areas or compartments defined within the housing and normally readily accessible through the open upwardly facing or top side of the housing when the same is facing horizontally may be readily accessible through the side of the housing portion facing outwardly of the aforementioned marginal edge when the free end of the housing portion is swung downwardly. Further, there is provided a removable cover assembly for the open normally upwardly facing top side of the housing portion.

Still further, the cover assembly for the housing portion includes collapsible leg means which are shiftable between collapsed positions closely underlying the undersurface of the cover assembly and operative positions projecting downwardly from the cover assembly in order that the latter may be utilized as a table when it is removed from the housing portion. In addition, the cover assembly of the housing assembly is defined by three side-by-side panel sections and the center section of these sections is laterally displaceable above the planes containing the upper surfaces of the sections disposed on opposite sides of the center section so as to enable the center section to define an elevated table top above a pair of bench-like seats defined by the opposite side panel sections of the cover assembly extending along opposite side marginal edge portions of the raised center section. Finally, the collapsible leg means and the center and opposite side sections of the cover assembly are operatively interconnected to effect displacement of the center section above the opposite side sections in response to movement of the leg means from the collapsed positions thereof to the operative positions thereof.

The main object of this invention is to provide a novel and useful supporting rack and housing assembly for vehicles.

Another object of this invention is to provide the housing assembly of the instant invention with pivotally supported article receiving areas or shelves simultaneously pivotable through a connection between the article supporting sections or shelves and the supporting rack portion for the housing, relative to the housing portion during swinging movement of the housing assembly relative to the supporting rack portion of the instant invention after the housing assembly has been slid relative to the rack portion so as to project considerably outwardly of one side of the associated vehicle in a manner such that the shelves are maintained substantially horizontal throughout pivotal movement of the housing portion relative to the rack portion.

Yet another object of this invention is to provide a removable cover assembly for the housing portion of the instant invention including collapsible leg means enabling the cover assembly to be utilized as a table after the cover assembly has been removed from the housing portion.

Still another object of this invention is to provide a cover assembly in accordance with the immediately preceding object and including means by which the cover assembly may have various components thereof displaced relative to each other so as to define a center raised table top section between two elongated lower bench-type seat sections extending along opposite sides of the table top section.

Still another object of this invention, in accordance with the immediately preceding object, is to provide means operatively interconnecting the leg means of the cover assembly and the aforementioned various components thereof in a manner such that the center section of the cover assembly will be automatically displaced relative to the bench-type seat defining sections during movement of the leg means from the collapsed inoperative positions to the extended operative positions.

A final object of this invention to be specifically enumerated herein is to provide a convertible rack for vehicles in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of a vehticle shown with the convertible rack assembly of the instant invention operatively supported from the vehicle and with extension portions of the rack portion of the invention operatively positioned in preparation to the housing portion of the invention being shifted longitudinally of the rack portion and having its free rear end swung downwardly relative to the rack portion;

FIGURE 2 is a side elevational view of the assemblage illustrated in FIGURE 1 and with an alternate position of the housing portion shown in phantom lines;

FIGURE 3 is a fragmentary side elevational view of the extreme rear portion of the vehicle illustrated in FIGURES 1 and 2 and with different alternate position of the housing portion illustrated in solid and phantom lines and with portions of the housing portion and vehicle being broken away and illustrated in vertical section;

FIGURE 4 is a fragmentary elevational view of the assemblage illustrated in FIGURE 3 as seen from the left side thereof;

FIGURE 5 is an enlarged vertical sectional view taken substantially upon the plane indicated by the section line 5—5 of FIGURE 1;

FIGURE 6 is an enlarged fragmentary longitudinal vertical sectional view taken substantially upon the plane indicated by the section line 6—6 of FIGURE 5;

FIGURE 7 is a perspective view of one portion of the rack portion of the instant invention from which the housing portion may be supported and locked in a transporting position;

FIGURE 8 is a fragmentary enlarged vertical sectional view taken substantially upon the plane indicated by the section line 8—8 of FIGURE 1;

FIGURE 9 is a fragmentary horizontal sectional view taken substantially upon the plane indicated by the section line 9—9 of FIGURE 3;

FIGURE 10 is a bottom plan view of the top panel assembly of the housing with portions thereof being broken away and shown in horizontal section;

FIGURE 11 is a side elevational view of the embodiment illustrated in FIGURE 10 but with the center section of the top panel assembly displaced upwardly from the opposite side sections thereof in order to form a table and bench assembly thereof and with the leg assemblies of the table and bench assembly in the operative positions, an alternate position of one of the leg assemblies and the adjacent ends of the opposite side sections of the cover assembly being illustrated in phantom lines and parts of the cover assembly being broken away illustrated in longitudinal vertical section; and FIGURE 12 is a transverse vertical sectional view taken substantially upon the plane indicated by the section line 12—12 of FIGURE 11.

Referring now more specifically to the drawings the numeral 10 generally designates a station wagon vehicle including a top 12 and a rear bumper 14. The convertible rack assembly of the instant invention is generally designated by the reference numeral 16 and includes a rack portion referred to in general by the reference numeral 18 and a housing portion generally referred to by the reference numeral 20.

The rack portion 18 includes a pair of cylindrical rail members 22 each supported from the top 12 by means of a pair of front and rear standards 24 and 26. The standards 24 and 26 include base portions 28 which are secured to the top 12 by means of suitable fasteners 30, see FIGURE 6, and upright portions 32 to whose upper ends generally semi-cylindrical cradle portions 34 are secured. The crade portions 34 embracingly receive the lower portions of the corresponding end to the associated rail member 22 and are secured thereto by means of fasteners 36, see FIGURE 2.

The rail members 22 are tubular and each is provided with a setscrew 38, FIGURE 2, adjacent its rear end by which one end portion of an associated rail extension 40 telescoped into the rail member 22 may be secured in adjusted position. The rear ends of the rail extensions 40 each have an extendable upper end section 42 of a support strut 44 pivotally secured thereto by means of a fastener 46. The lower section 48 of each support strut 44 is provided with a setscrew 50 adjacent its upper end for securing the corresponding upper end section 42 in adjusted position and a mounting bracket 52 on its lower end for removable securement to the rear bumper 14. Further, each of the rail extensions 40 has an abutment member 54 mounted thereon and secured in adjusted position longitudinally thereof. Each of the abutment members 54 defines a forwardly opening non-circular recess 56 whose purpose is to be hereinafter more fully set forth.

The housing portion 20 includes an open top lower half or section 58 including front and rear walls 60 and 62 and opposite side walls 64 interconnected by means of a bottom wall 66. The front wall 60 is curved and the opposite side walls 64 and the rear wall 62 include corrugations 68 defining stiffening ribs. Further, the bottom wall 66 also includes corrugations 70 defining stiffening ribs.

The upper extremity of the front wall 60 includes an upstanding flange 72 whose upper edge is coplanar with the upper edges of the opposite side walls 64 and the rear wall 62 and which coacts therewith to form an opening 74 through which access to the interior of the lower housing section 58 may be gained.

The housing portion 20 also includes a top assembly generally referred to by the reference numeral 76 and including a top panel 78 from whose marginal edge portions front and rear flanges 80 and 82 and a pair of opposite side flanges 84 depend. The cover or top assembly 76 is positionable over the upper end of the lower housing section 58 with the flanges 80, 82 and 84 telescoped over the flange 72, the upper marginal edge portion of the rear wall 62, and the upper marginal edge portions of the opposite side walls 64. Additionally, suitable latch means 86 are provided for releasably securing the cover assembly 76 to the lower housing section 58, and it is to be noted that the cover assembly 76 provides a water-tight closure for the opening 74 in the upper portion of the lower housing section 58.

With reference now more specifically to FIGURES 3–6 of the drawings it may be seen that a front or top shelf 90 is secured between the side walls 64 and also to the bottom wall 66 in the front end of the lower housing section 58. Further, an intermedaite shelf assembly 92 and a lower or rear shelf assembly 94 are pivotally secured between the side walls 64 by means of pivot shafts 96 and 98, respectively, journalled between the side walls 64. A pair of connecting links 100 have their opposite ends pivotally secured to the shelf assemblies 92 and 94 and a pair of connecting links 102 have their opposite ends pivotally secured to the shelf assembly 92 and the free ends of a pair of crank arms 104 carried by the opposite ends of a shaft 106 journalled through the front ends of the side walls 64 and through sleeve members 108 secured to and projecting outwardly of the side walls 64. The sleeve members 108 are secured to the side walls 64 in any convenient manner such as by welding 110 and the shaft 106 projects through openings 112 provided therefor in the side walls 64 and has its opposite ends journalled in the sleeve members.

The outer ends oft he sleeve members 108 include diametrically reduced end portions 114 on which grooved rollers 116 are journalled and the outer ends of the shaft 106 project outwardly of the free ends of the sleeve members 103 and terminate in non-circular terminal end portions 118 on which a pair of sleeves having complementary bores formed therethrough are slidingly disposed for rotation therewith. Suitable fastener means 122 are provided for retaining the sleeves 120 on the terminal end portions 118.

The crank arms 104 are secured to the shaft 106 by means of pins 124 for rotation therewith and the sleeves 120 are substantially square in outer peripheral cross-sectional shape. Further, the sleeves 108 are provided with outwardly projecting abutment arms 128 including wedge-shaped laterally directed end portions 130 having bores 132 formed therethrough.

Each of the front standards 24 includes an upper inner rearwardly opening V-shaped stop 134 in which the corresponding end portion 130 is seatingly receivable and a locking pin 136 may be passed through suitable bores provided therefor in the stop 134 and the corresponding bore 132 in order to lock the housing portion 20 in its forwardmost position illustrated in FIGURES 2 and 5 of the drawings.

A pair of stub shafts 140 are secured through and project outwardly of the rear ends of the opposite side walls 64 adjacent the bottom wall 66 and include diametrically reduced outer end portions 142 on which a second pair of grooved rollers 144 are journalled. The rollers 116 and 144 are disposed in rolling engagement with the corresponding rail members 22 and the inner end portions of the stub shafts 140 are provided with abutment arms 146 corresponding to the abutment arms 128 including wedge-shaped terminal end portions 148 corresponding to the end portions 130 and which are also provided with suitable (bores not shown) corresponding to the bores 132. The rear standards 26 include inner lower V-shaped stops 150 corresponding to the stops 134 and a pair of rear locking pins 152 corresponding to the locking pins 136 are also provided. At this point it may be noted from FIGURE 5 of the drawings that the lower ends of the abutment arms 128 including the end portions 130 thereon are disposed at an elevation enabling them to pass over the stops 150 during rearward shifting of the housing portion 20 relative to the rack portion 18. Further, it is to be noted that the outer ends of the stub shafts 140 are adapted to pass freely between the notched portions of the abutment members 54 in order that the latter may be engaged by the sleeves 120, the notches 56 being flared at their open ends as at 156 to guidingly receive the sleeves 120 therein.

In operation, the rail extensions 40 may be erected as illustrated in FIGURES 1 and 2 of the drawings and supported from the rail members 22 and the bumper 14. Thereafter, the locking pins 136 and 152, supported and guided by the elements 18, 22, 24, 26 and 40, may be removed and the housing portion 20 may be rolled rearwardly along the rail members 22. As the housing portion 20 is rolled rearwardly to the dotted line position illustrated in FIGURE 3 of the drawings, it is supported for oscillation by means of elements 22, 106, 114 and 116 and the sleeves 120 will be seatingly received in the notches or recesses 56, and the portions 56, 104 and 120 will coact to maintain the shelves 92 and 94 horizontal with the opposite ends of the shaft 106 locked to the rail extensions 140 against rotataion relative thereto. Of course, inasmuch as the housing portion 20 is receivable between the rear ends of the rail extensions 40, the rear end of the housing portion 20 may be swung downwardly through the dotted line position illustrated in FIGURE 2 of the drawings and to the substantially vertically disposed position illustrated by solid lines in FIGURE 3 of the drawings while the shaft 106 is maintained against rotation in order to maintain the shelf assemblies 92 and 94 in horizontally disposed positions.

Should it be desired to remove the housing portion 20 from the rack portion 18, it is merely necessary to urge the upper portion of the vertically disposed housing portion 20 in FIGURE 3 of the drawings forwardly to unseat the sleeves 120 from the pockets or recesses 56. Thereafter, the housing portion 20 may be raised and moved rearwardly past the abutment members 54.

With attention now invited more specifically to FIGURES 10–12 of the drawings, it will be noted that the cover or top assembly 76 includes three panel sections 156, 158 and 160, the section 158 defining a center section and the sections 156 and 160 defining opposite side sections. The adjacent longitudinal edge portions of the sections 156 and 160 include upwardly opening grooves 162 in which depending opposite side flange portions 164 of the section 158 are receivable. In addition, the sections 156 and 160 include depending opposite end flanges 166 and outer side depending flange portions 168. Further, the center section 158 includes opposite end depending flanges 170 whose outer surfaces are coplanar with the outer surfaces of the corresponding flange or flange portions 166 when the upper surfaces of the sections 156 and 160 are coplanar with the upper surface of the section 158.

The section 158 has a pair of journal supports 172 secured to its undersurface adjacent its opposite ends and a center support 174 secured to its undersurface centrally intermediate its opposite ends. A pair of crankshafts 176 are provided and each includes a pair of axially aligned end portions 178 and a crank throw 180. The crank throws 180 are journalled from the journal supports 172 and the remote ends of each pair of end portions 178 are rotatably and slidably received in horizontally slotted support brackets 182 secured to the undersurface of the sections 156 and 160. Further, the remote ends of each pair of end portions 178 include a pair of parallel laterally directed terminal ends 184 which define collapsible legs for the cover assembly 76 in order that the latter may be utilized as a table and bench combination.

The adjacent ends of each pair of corresponding end portions 178 are operatively connected to the center support 174 by means of a pair of pivotally interconnected links 186 and 188 pivotally secured to each other as at 190. The free end of the links 188 remote from the links 186 are pivotally connected to the inner end of the corresponding end portion 178 as at 192 and the end of the links 186 remote from the corresponding link 188 are pivotally connected to the center support 174 as at 194. Further, each pair of pivotally interconnected links 186 and 188 includes a slide sleeve 196 which may be shifted between the inoperative dotted line position illustrated in FIGURE 11 and the operative solid link position illustrated in FIGURE 11 to releasably lock the legs 184 in the depending positions illustrated in solid lines in FIGURES 11 and 12.

Inasmuch as the sections 156 and 160 are connected to the section 158 by means of the crankshafts 176, as the legs 184 are swung about the longitudinal axes of the end portions 178 in order to pivot the legs 184 from the collapsed inoperative positions illustrated in FIGURE 10 of the drawings to the depending positions illustrated in FIGURES 11 and 12 of the drawings, the crank throws 180 elevate the corresponding ends of the center section 158 in order that the latter may define a bench top and the sections 156 and 160 may define bench-type seats extending along and disposed below the opposite longitudinal edge portions of the section 158. Accordingly, it may be seen that the cover assembly 76 may be readily transformed from a generally panel-like configuration closing the top of the lower housing section 58 and a table and bench configuration such as that illustrated in FIGURES 11 and 12.

The foregoing is considered as illustrative only of the principles of the invention. Further, since numerous modifications and changes will readily occur to those skilled

What is claimed as new is as follows:

1. A convertible rack for vehicles comprising a hollow housing including one side which is at least partially open, internal shelves in said housing and pivotally supported therefrom for swinging movement about generally parallel horizontal axes disposed in planes generally paralleling said one side and spaced along one dimension of said side, support and guide means adapted for support from a top portion of a vehicle, said support and guide means and said housing including coacting means supporting said housing from said support and guide means for oscillation of said housing about a horizontal axis between a first position with said one side thereof facing upwardly and a second position with said one side facing generally horizontally, said coacting means including means operatively connected to said shelves for automatically maintaining said shelves generally horizontally disposed during pivoting movement of said housing relative to said support and guide means between said first and second positions.

2. The combination of claim 1 wherein said coacting means also includes means supporting said housing from said support and guide means for generally horizontal reciprocal movement laterally of the axis of pivotal movement of said housing relative to said support and guide means.

3. The combination of claim 2 wherein said support and guide means includes a longitudinal dimension extending in the path of reciprocal movement of said housing relative to said support and guide means, said support and guide means being adapted for support from said upper portion of said vehicle with said longitudinal dimension disposed generally horizontally and said support and guide means extending, from one end thereof, inwardly over said top portion from one marginal portion of said top portion.

4. The combination of claim 3 wherein said housing is elongated and said axes extend transversely thereof, said housing being weighted to be heavier on the side of its axis of rotation relative to said support and guide means corresponding to said one end thereof.

5. The combination of claim 1 including a cover assembly for said one side of said housing removably securable over the open portion of said one side.

6. The combination of claim 5 wherein said cover assembly includes a top panel and depending peripheral wall portions extending about said top panel, said one side of said housing including upstanding flange portions extending about the periphery of the opening therein defined by said open portion, said wall portions being telescoped downwardly over said flange portions when said cover assembly is secured to said housing.

7. The combination of claim 6 wherein said cover assembly includes collapsible leg means supported from said top panel for movement between collapsed positions disposed within the confines of said wall portions and operative positions projecting downwardly from said top panel for use when said cover assembly is removed from said housing and top panel is to act as a table top supported by said legs.

8. The combination of claim 7 wherein said top panel includes three side-by-side panel sections, the center section of said sections being laterally displaceable above the planes containing the upper surfaces of the sections disposed on opposite sides of said center section so as to enable said center section to define an elevated table top above a pair of bench-like seats defined by said opposite side sections.

9. The combination of claim 8 wherein said leg means and said center and opposite side sections are operatively interconnected to effect displacement of said center section above said opposite side sections in response to movement of said leg means from said collapsed positions to said operative positions.

References Cited

UNITED STATES PATENTS

| | | | |
|---|---|---|---|
| 102,977 | 5/1870 | Simonson | 312—267 |
| 2,537,669 | 1/1951 | Honig | 312—269 |
| 2,684,796 | 7/1954 | Swenson | 224—42.1 |
| 2,948,576 | 8/1960 | Ball | 224—42.1 X |
| 3,112,041 | 11/1963 | Havens | 214—450 |
| 3,113,819 | 12/1963 | Bessette | 224—42.1 X |
| 3,201,186 | 8/1965 | Noonan et al. | 224—42.1 X |

FOREIGN PATENTS 145,580   5/1931   Switzerland.

GERALD M. FORLENZA, *Primary Examiner.*

F. E. WERNER, R. J. SPAR, *Assistant Examiners.*